United States Patent [19]
Tomita

[11] Patent Number: 5,192,953
[45] Date of Patent: Mar. 9, 1993

[54] PAVEMENT STRUCTURE EXAMINATION VEHICLE

[75] Inventor: Hiroshi Tomita, Tokyo, Japan
[73] Assignee: Geo Search Co., Ltd., Tokyo, Japan
[21] Appl. No.: 787,012
[22] Filed: Nov. 4, 1991

[30] Foreign Application Priority Data

Nov. 6, 1990 [JP] Japan ................................ 2-300299

[51] Int. Cl.$^5$ .......................... G01V 3/12; E21B 7/02
[52] U.S. Cl. ...................................... 342/22; 342/52; 173/28; 324/337
[58] Field of Search ...................... 342/22, 52; 173/22, 173/23, 28, 146; 324/337

[56] References Cited

U.S. PATENT DOCUMENTS

| | | | |
|---|---|---|---|
| 4,653,316 | 3/1987 | Fukuhara | 73/146 |
| 4,698,634 | 10/1987 | Alongi et al. | 342/22 |
| 4,723,868 | 2/1988 | Ferguson | 173/28 |
| 4,910,593 | 3/1990 | Weil | 358/113 |
| 4,938,060 | 6/1990 | Sizer et al. | 367/35 |

Primary Examiner—Gilberto Barrón, Jr.
Attorney, Agent, or Firm—McAulay Fisher Nissen Goldberg & Kiel

[57] ABSTRACT

A pavement structure examination vehicle capable of mounting all necessary equipments and instruments therein; including a body of a rear gate type having a rear door which rotates vertically to open and close, underground radar means attached to the body vertically movably relative to the direction of traveling, a stand for boring operation to be removably attached to the door, a radar system comprising underground radar control means for controlling the underground radar means and observation data recording means for recording the observation data of the underground radar means, the radar system recording in the data recording means information of the distance covered by the vehicle received from covered distance detection means which detects the distance covered by the vehicle, together with the observation data of the underground radar means, and an image processing system for photographing a surface of an inner circumferential wall of a bored hole and processing images thus photographed. The vehicle can examine day and night without disturbing the traffic, and also can get the data of the underground radar and find the position of the road to be actually investigated precisely and easily.

4 Claims, 9 Drawing Sheets

PAVEMENT STRUCTURE EXAMINATION VEHICLE

BACKGROUND OF THE INVENTION

1. Field of the Invention

The present invention relates to a pavement structure examination vehicle which examines a structure of the ground of a paved road while traveling at high velocity on the paved road.

2. Description of the Related Art

Figure 11:
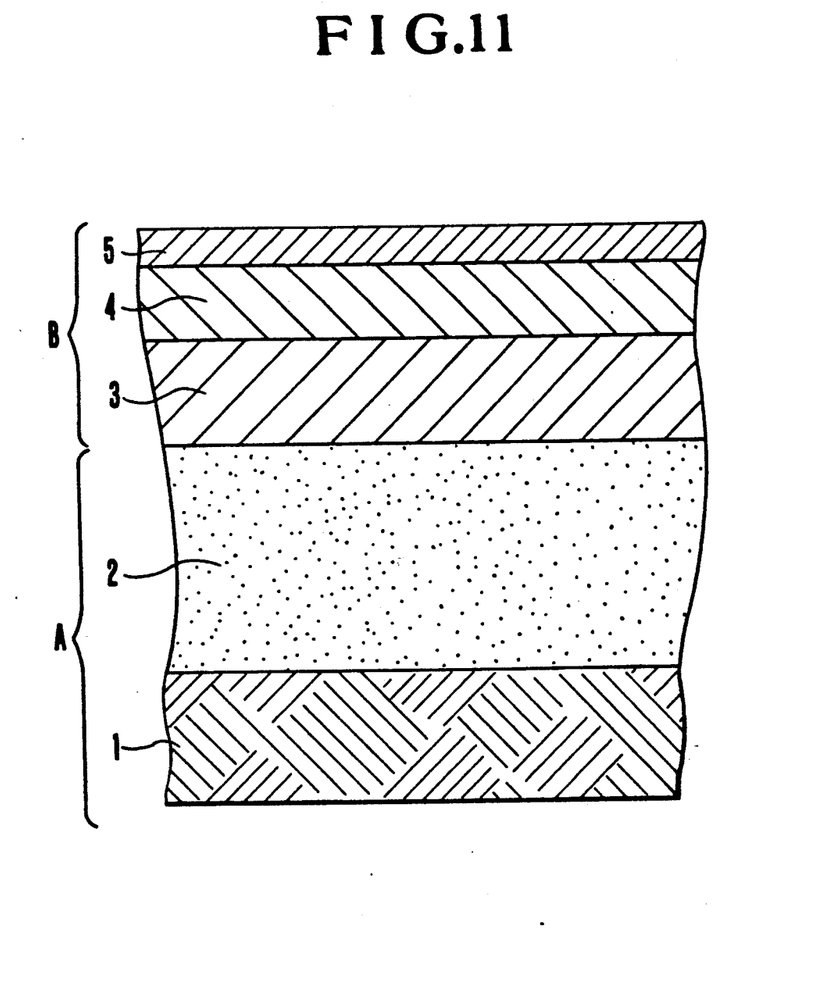
FIG. 11 shows the ground structure of a paved road.

The ground structure of a paved road is composed of a roadbed A and a paved floor B on the roadbed A as shown in FIG. 11, and the roadbed A comprises, for example, a sand layer 2 rammed down on a miscellaneous soil layer 1 which is mixed with ballasts and crushed matters, and the paved floor B is composed of, for example, three asphalt layers 3, 4 and 5 in which the size of a mixed gravel is decreased in order from the gravel included in the bottom asphalt layer 3 which is located on the sand layer 2 to the gravel in the uppermost layer 5 which forms the road surface.

As a method for examining the structure of a ground of the paved road, a method using an underground radar means based on the electromagnetic wave reflection method has been known in the art.

Figure 5:
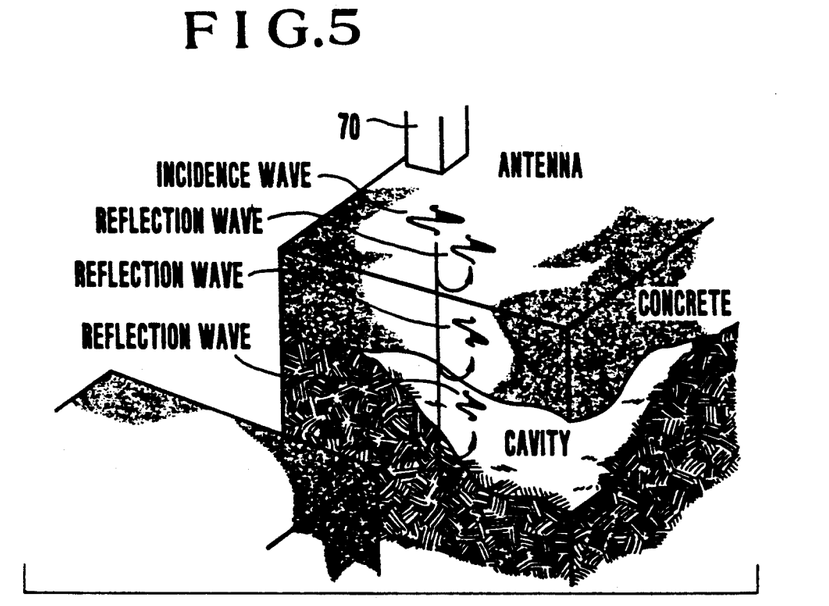
FIG. 5 is a view explaining the principle of the underground radar system.

The principle of this method is that pulsed electromagnetic waves radiated from an antenna reflect partially at respective borders of layers which have electrically different properties (dielectric constant) as shown in FIG. 5. When the ground structure of a paved road is composed of a plurality of layers, reflection waves are generated in the same number as that of the layers and a series of pulses are observed in a time-delayed manner.

The time difference between pulses corresponds to the time required by the passage of the pulse through the layer.

An electromagnetic wave has a different velocity according to the difference of the dielectric constant of a medium. Generally the velocity of an electromagnetic wave in natural substances is much less than that of 300 thousand km per second in vacuum. Therefore, when the time is converted into the distance by using the velocity of the electromagnetic wave in these substances, the actual state of the layer of the ground can be made clear.

Figure 6:
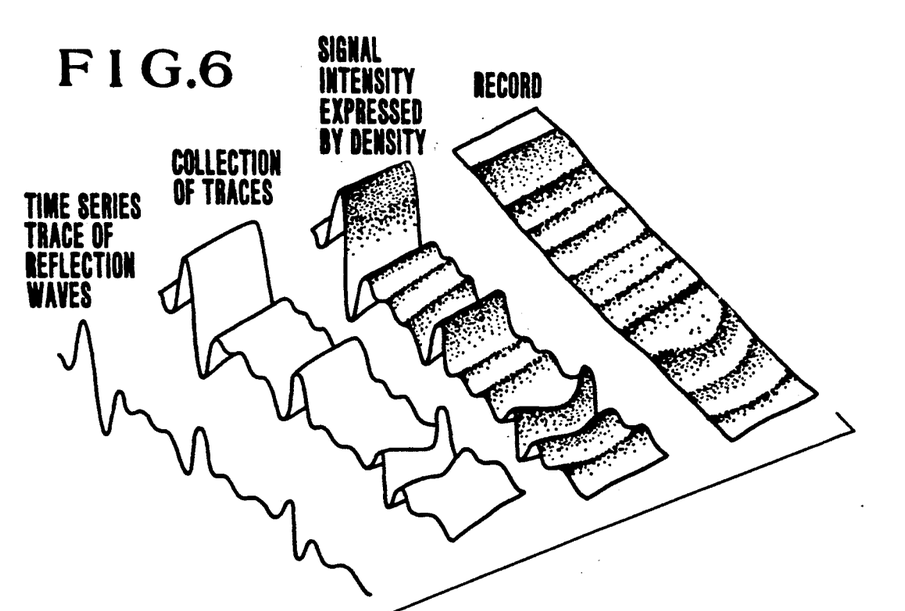
FIG. 6 is a view explaining the analysis of the data which is obtained by the principle shown in FIG. 5.

When a measuring apparatus (such as underground radar) is moved continuously radiating pulses of electromagnetic waves, the reflection of the pulses are received on a sheet as a plane belt-form record with changing patterns, and further, when the intensity of reflection of pulses are put out in light and shade expression, the records such as shown in FIG. 6 can be printed out.

Then the examination for discovering the ground of a defective structure is conducted on the basis of this data, and the structure of the ground is actually investigated by such as digging of the paved road of the place thus discovered.

The examination of the paved road in this way is now conducted manually by running a vehicle mounted with a radar at low speed, so that this examination has been often conducted at night when the traffic is light, thereby minimizing problems of a risk of accident.

Also there has been a problem that the position of the road can not be detected correctly and easily from the data shown in FIG. 6, and it takes time to determine the position to be investigated.

Further, though the instruments to be used in the actual examination of the ground can be miniaturized according to the examination method developed by the applicant, they are all mounted on a vehicle other than the vehicle mounted with the aforementioned radar, so that it has been desired that all the equipment and instruments are mounted in one vehicle.

SUMMARY OF THE INVENTION

An object of the present invention is to solve these problems and provide a pavement structure examination vehicle which is so made that it can mount all the necessary equipment and instruments thereon, and can examine day and night without disturbing the traffic, and also can get the data of the underground radar and find the position of the road to be actually investigated precisely and easily.

The pavement structure examination vehicle for realizing the object of the present invention is characterized by the structural features that, a rear gate type body of the vehicle is provided with a rear door which vertically rotates to open and close, an underground radar means is equipped to the body of the vehicle vertically movably relative to the face of running, the rear door is so prepared that a stand for boring can be attached thereto, a radar system consisting of a control means for controlling the underground radar means and an observation data recording means for recording the observation data of the underground radar means, is provided for recording in the data recording means information of the distance covered by the vehicle received from a covered distance detection means which detects a distance covered by the vehicle, together with the observation data of the radar means, and an image processing system is provided for photographing the surface of an inner circumferential wall of the bored hole and processing the images thus photographed.

The pavement structure examination vehicle constructed as described above can examine the ground of the paved road by means of the underground radar means while proceeding at high speed, and can utilize the recorded information of the covered distance together with the data observed, for specifying the location of the paved road where the ground structure is to be examined by boring.

Further, the equipment to be used, after the examination, for the boring of the place wherein the abnormality is involved and a means for photographing the surface of the inner circumferential wall of the bored investigation hole are equipped in the vehicle. Therefore by opening the rear gate and setting these equipment in place, the boring and photographing of the surface of the inner circumferential wall can be performed.

For a better understanding of the present invention, reference is made to the following description and accompanying drawings while the scope of the invention will be pointed out in the appended claims.

DETAILED DESCRIPTION OF THE PREFERRED EMBODIMENT

Detailed description of the present invention will be made hereinbelow with reference to the embodiment shown in the drawings.

Figure 1:
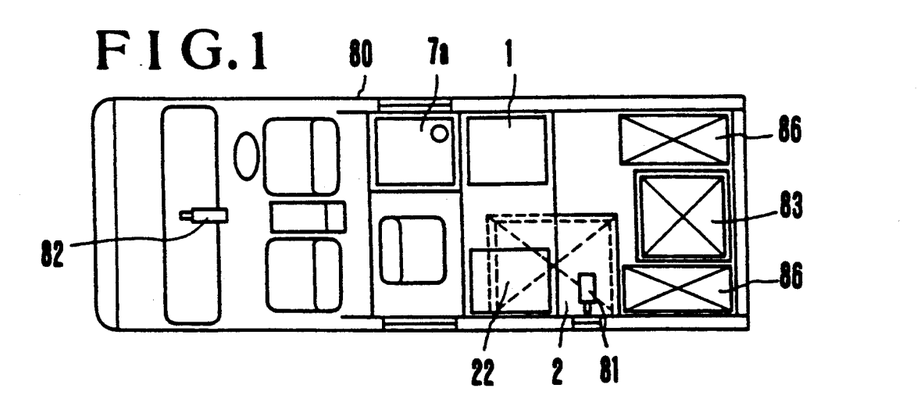
FIG. 1 is a view showing a transverse section of one embodiment of the pavement structure examination vehicle of the present invention, FIG. 2 (a) and (b) show respectively a side and a rear view of the vehicle, FIG. 3 (a) and (b) show respectively a side view of the vehicle and a side view of the rear portion of the vehicle with a rear gate opened.
Figure 2A:
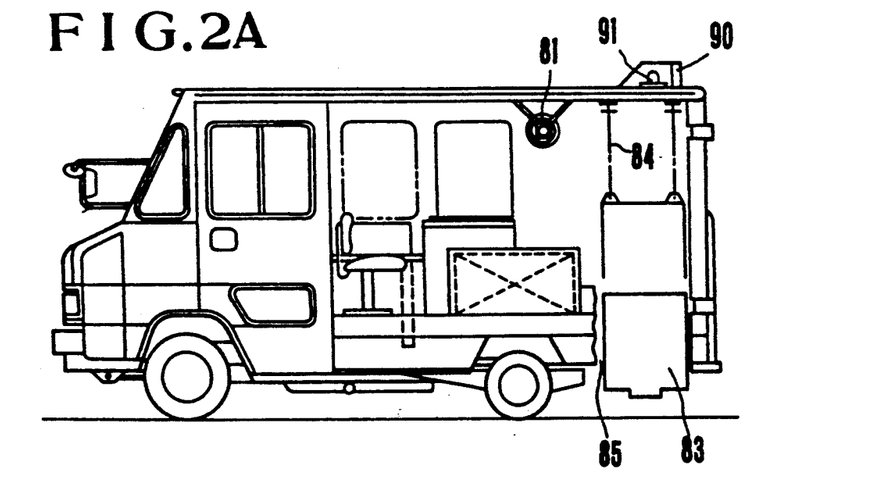
Figure 2B:
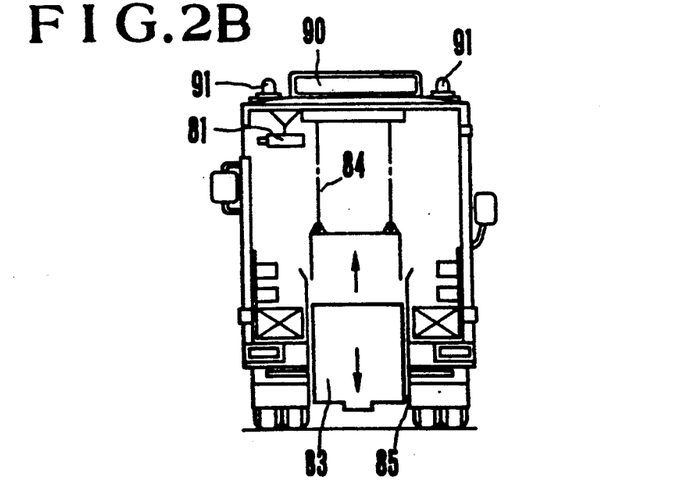
Figure 3A:
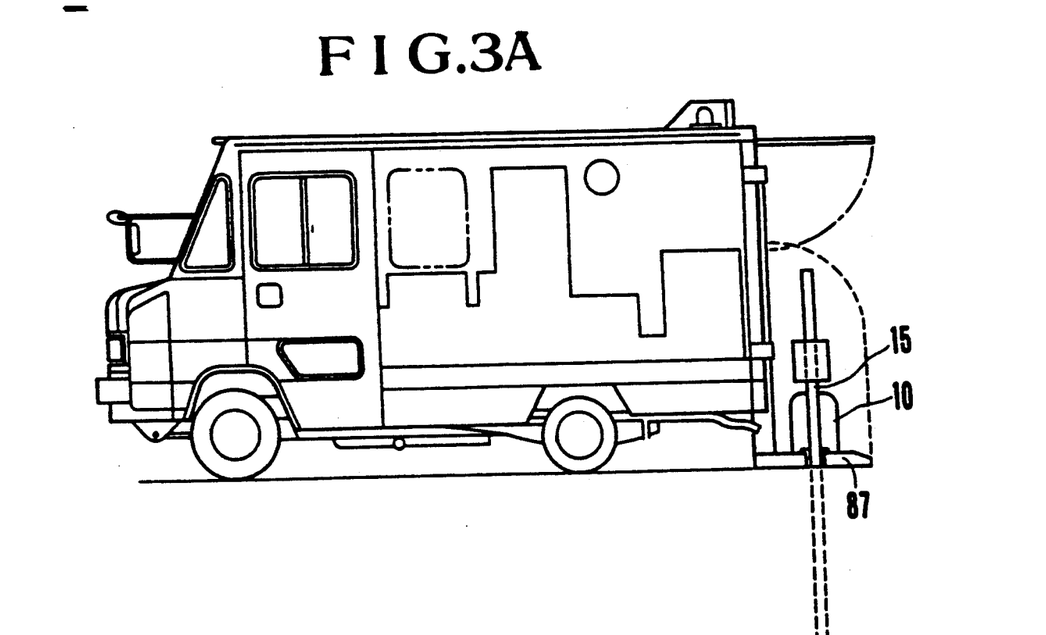
Figure 3B:
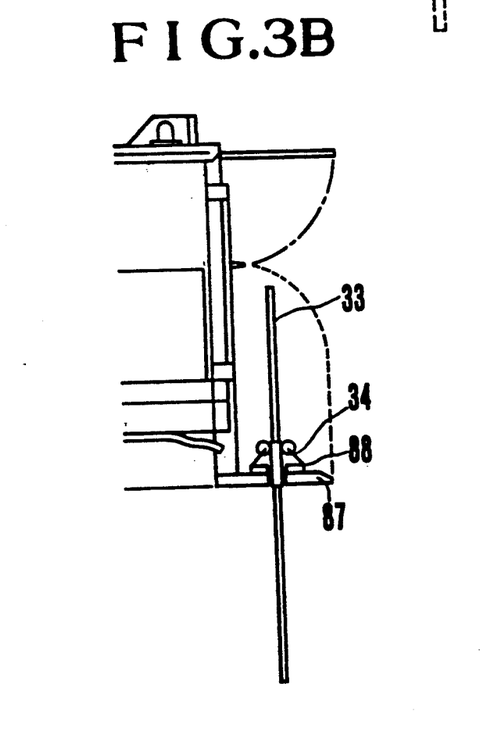
Figure 4:
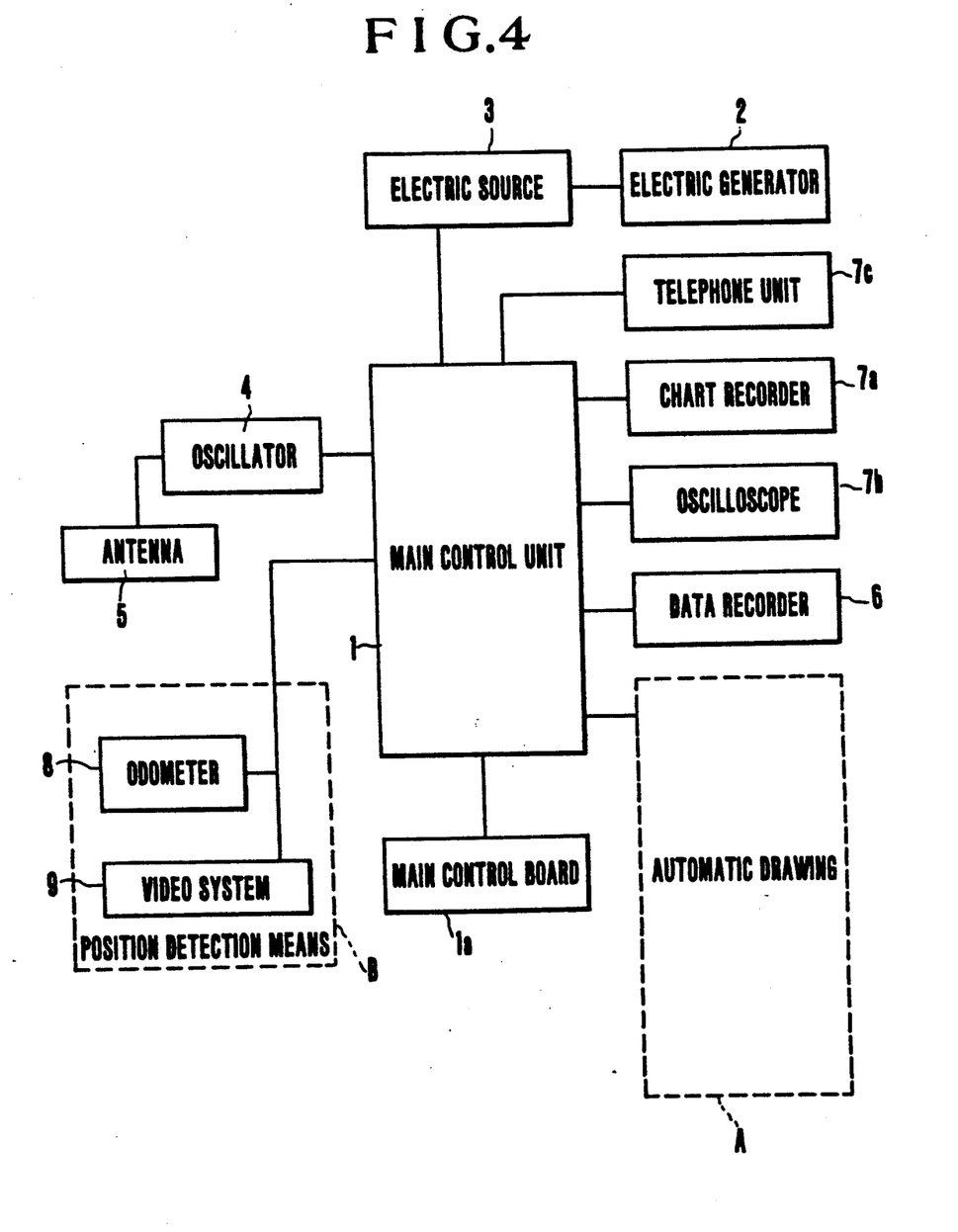
FIG. 4 is a view showing a block diagram of the underground radar system.

FIG. 1 through FIG. 3 are views respectively showing one embodiment of the pavement structure examination vehicle of the present invention, and FIG. 4 is a block diagram showing the system of the underground radar system which is mounted on the vehicle shown in FIG. 1.

In FIG. 4, the reference numeral 1 denotes a main control unit which has an image processing unit and is operated by a main control board 1a, being supplied with a constant voltage which is obtained from an electric source 3, which adjusts an electricity flow generated by an electric generator of the vehicle or by an electric generator 2 separately mounted on the vehicle.

The main control unit 1 transmits electromagnetic waves to an antenna 5, controlling an oscillator or 4 which acts as both a transmitter and a receiver of the radar. The control unit 1 transmits electromagnetic waves in pulsation toward the underground as shown in FIG. 6, then receives the reflection waves by the antenna 5, which sends the data observed to the unit 1 via the oscillator 4. This data is usually recorded by a data recorder 6 as analog signals without passing the image processing unit of the main control unit 1, and also inputted into an automatic drawing apparatus A. However, it is acceptable to provide this automatic drawing apparatus A separately without mounting on the vehicle, and to input the data therein, after examination, for analyzing them which are recorded by the data recorder 6. The automatic drawing apparatus A is composed of such as a personal computer, digitizer and plotter, and provided for typically drawing the sections of the structure of the ground located within the area where the vehicle travels for examination. The information to be inputted into this drawing apparatus is the information from the above-mentioned underground radar and additionally information to be obtained from a boring operation which will be described later.

Further, the observation data of the underground radar is printed out by a chart recorder 7a, for example, by a printer, so that it is made possible to grasp the observation results of the radar in real time and also it is made possible to grasp the operating conditions of the underground radar in real time by means of the images of the reflection waves displayed on an oscilloscope 7b.

Meanwhile, a driver or a crew member such as a measuring staff being on board the vehicle has a telephone unit 7c, and stationed to input circumferential conditions of the road by voice into the data recorder 6 while traveling. Namely, it is made possible to grasp the circumferential conditions of the road where the ground structure is to be investigated, by means of the observation data of the underground radar by superposing thereon the circumferential conditions of the road transmitted by voice.

However, it is difficult to specify the location to the pin point only by voice, and the voice information can offer only an approximate target.

Therefore, in the present embodiment, a position detection means B is provided for detecting the position of the vehicle from the information of the covered distance and the images of the surroundings of the road. The position detection means B is composed of an odometer 8 of the vehicle and a video system 9 which comprises a first video camera for photographing side views of the vehicle, a second video camera for photographing front views of the vehicle, and a video recorder for recording image information photographed by the first and second video camera. The information of the covered distance of the odometer 8 is inputted into the video recorder of the video system and also into the data recorder 6 through the main control unit 1, at that time the data of the covered distance expressed in numeral is superimposed on the respective information of the video recorder and the data recorder. On the occasion, a sufficient observation data is obtained even when the vehicle travels at a speed of 40 through 60 km per hour for the examination of the ground structure by using the underground radar.

Namely, the covered distance of the vehicle from the starting point of the examination is recorded in the information of images and data observed, so that the place to be bored for investigation of the structure of the ground can be precisely specified. When the vehicle approaches the approximate location which is approximated by the aforementioned voice information, it is more clearly presumed by the scenery of the surrounding area photographed by the video cameras, and finally the precise location can be judged by checking the odometer of the vehicle. Therefore, when the location of the place to be investigated is searched, after the examination, for the boring investigation, it is not necessary to always watch the odometer of the vehicle, but it can travel again following the same route as the examination travel, by checking the information of the front view of the vehicle photographed and recorded in the video recorder, and the boring investigation can be performed at the precise position also in the direction of the width of the road.

Figure 7:
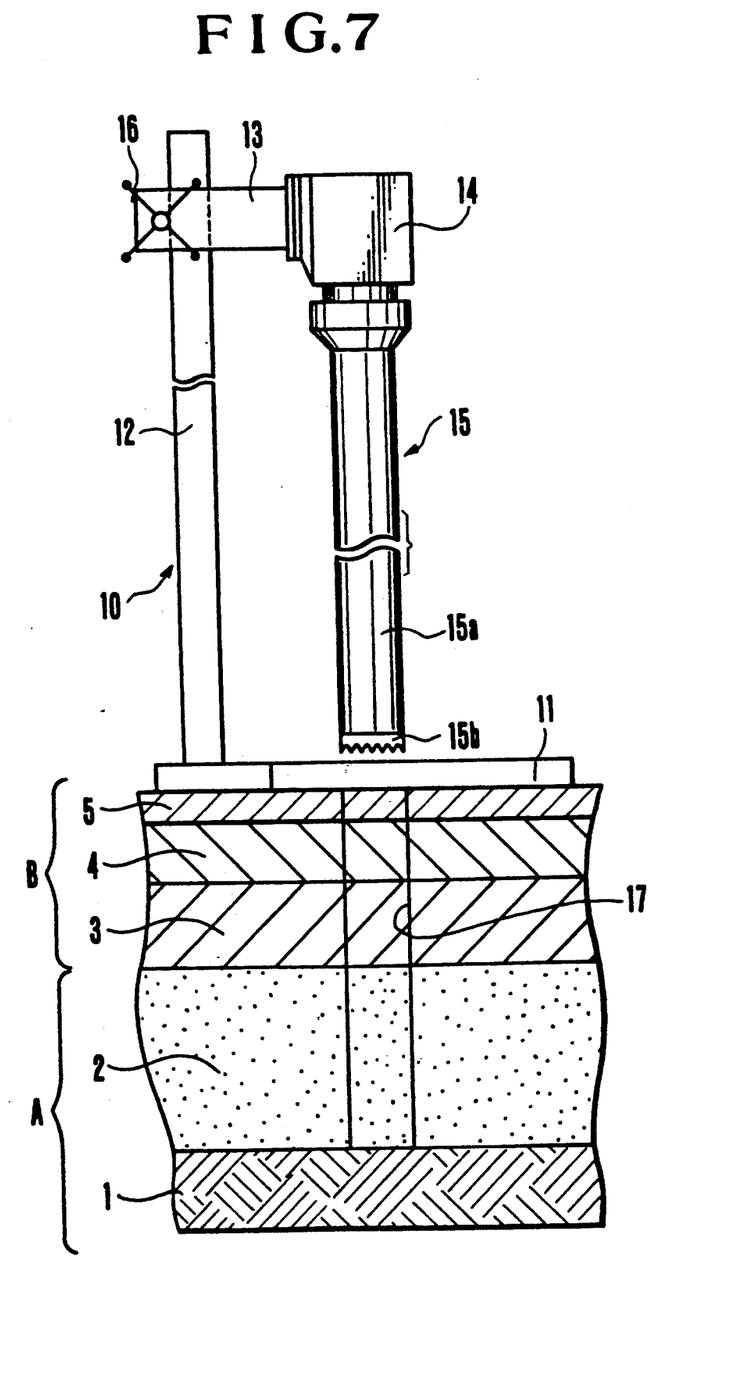
FIG. 7 is a view showing the boring operation.

Description of the investigation by boring will be made with reference to FIG. 7 through FIG. 11. In FIG. 7, the reference numeral 10 denotes a boring stand which is adapted to be attached to a rear gate of the vehicle to be described later. Further in FIG. 7, this boring stand 10 is shown being placed on the road for explanation of boring operation. In the boring stand 10, a support 12 is erected on a base plate 11 and a drill, for instance, a core drill 14 is attached to a lifting device 13 which is mounted on the support 12.

To this core drill 14, a drill 15 is removably attached for boring an investigation hole, for instance, approximately 1.2 m deep in the pavement, and then bores the pavement by manually operating a lifting handle 16 of the lifting device 13 to vertically and downwardly push down the drill 15 which is rotating in a high speed. From the view point of a nondestructive investigation, a preferable diameter of an investigation hole 17 which is bored by the drill 15 is approximately from 3 to 10 cm, and in the present embodiment, the investigation hole 17 is bored with the diameter of 3 cm. However, the diameter of the investigation hole 17 can be reduced to about 1 through 2 cm for an actual use.

The drill 15 comprises a cutter 15b made of such as diamond bits attached to the top of a tubular body 15a, and is adapted so as to be able to collect the cores of the ground of the pavement in the tubular body 15a. However, in the method of the present investigation, the surface of the inner circumferential wall of the bored hole is directly observed. Therefore, though the cores collected are useful as an auxiliary material for the investigation of the ground, they are not directly used for the investigation of the structure of the ground.

The ground of the paved road usually has an asphalt-paved floor, the depth of which is 50 through 60 cm from the surface of the road, so that while boring this paved floor, water is pressurized into the bore from the start of the boring to prevent a wear of the cutter 15b.

When the boring of the paved floor B is finished, the cutter 15b commences the boring of the sand layer 2, then the above-mentioned supply of a pressurized water in the boring operation of the paved floor is stopped to keep an intact state of the surface of the inner circumferential wall of the hole to be obtained by the boring of the sand layer. When the drill 15 transfers from the paved floor to the sand layer, it is detected, for example, by the feeling of the hand operating the lifting handle 16 of the lifting device 13, namely, it can be noticed by a fact that the pushing down force applied to the lifting handle 16 in the paved floor suddenly changes from strong to weak. When the lifting device 13 is automatically pushed down, the change in the pushing down force can be detected by means of such as a pressure sensor.

In addition, as is clear from the small diameter of the investigation hole 17 to be bored, the pressurized water which is supplied in the boring operation of the paved floor is required only in a small amount, so that when the boring transfers to the sand layer, a little delay in stopping the supply of pressurized water does not cause any trouble.

The investigation hole 17 to be used for investigating the ground has a depth of 1.2 m which equals to the total length of the drill 15, and usually this depth covers the sand layer 2, but according to circumstances the depth may be made approximately 2 m.

When the boring of the investigation hole 17 is finished, a small amount of water is ejected from such as a nozzle of a water pump to clean the surface of the inner circumferential wall of the investigation hole 17, and consecutively the water is suctioned by a suction pump to prevent the water from collecting in the investigation hole.

Then, it is preferable to clean the surface of the inner circumferential wall of the bored asphalt layer by means of the rotary brush, to make it possible to observe more clearly the surface of the inner circumferential wall of the bored paved floor. This rotary brush can be equipped in the core drill 14 in place of the drill 15, and by measuring a correct depth of the paved floor in the boring operation, cleaning of the paved floor can be performed with this rotary brush without touching the sand layer 2.

When the boring operation described above is finished, the observation of the wall surface of the investigation hole 17 which is 1.2 m deep, bored and cleaned, is conducted over the surface of the inner circumferential wall.

Figure 8:
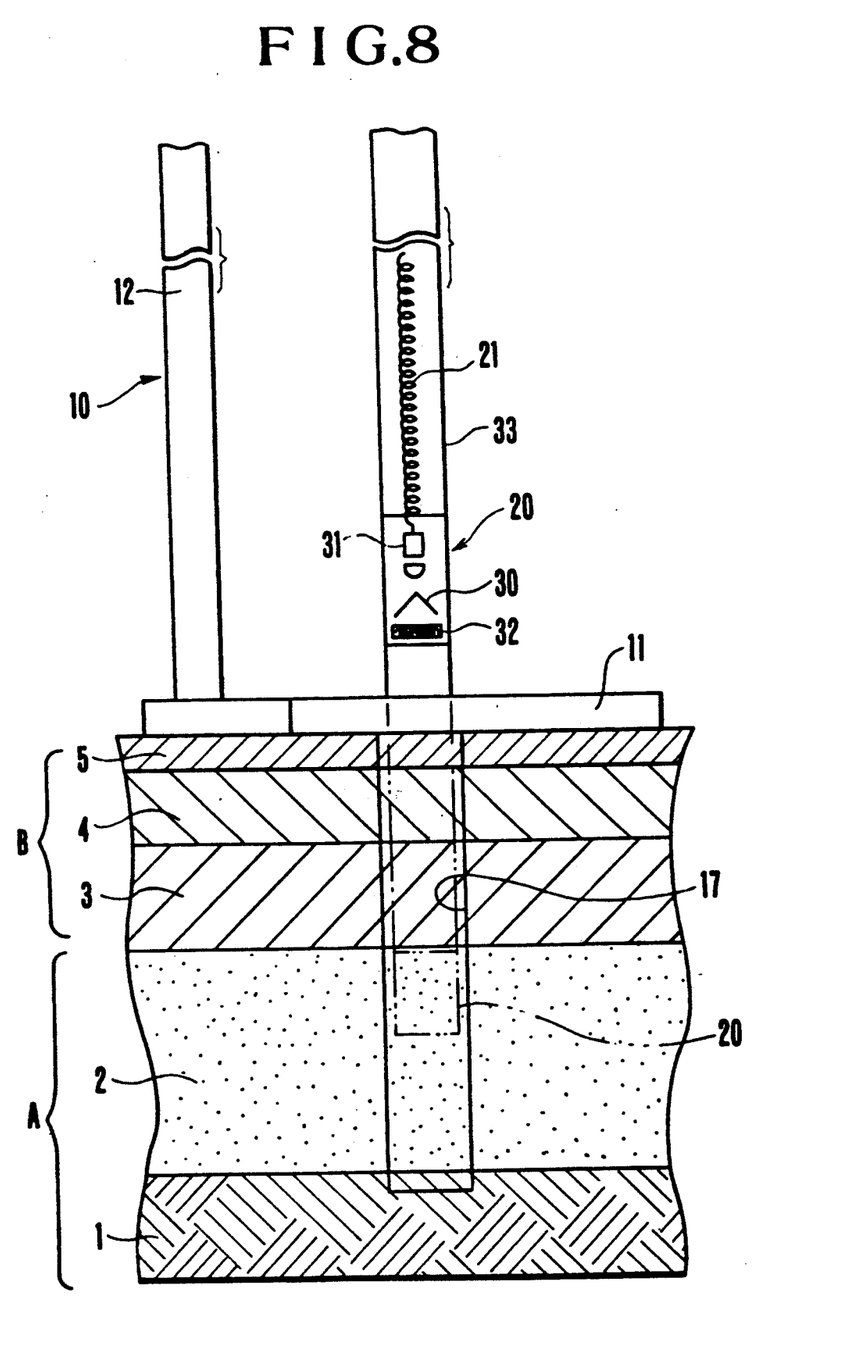
FIG. 8 is a view explaining the photographing operation of the surface of the inner circumferential wall.

The outline of this operation is shown in FIG. 8.

The observation of the wall surface is conducted by inserting an image pickup means 20 which comprises such as a CCD camera into the investigation hole 17, lowering the device at an almost constant speed and photographing all over (360°) the surface of the inner circumferential wall.

Images of the surface of the inner circumferential wall photographed by the image pickup means 20 are inputted into an image processing unit 22 through a connecting cable 21. On the occasion, a position data from later-described position detector 23 of an image pickup device is inputted into the image processing unit 22 corresponding to information of the photographed images.

Figure 9:
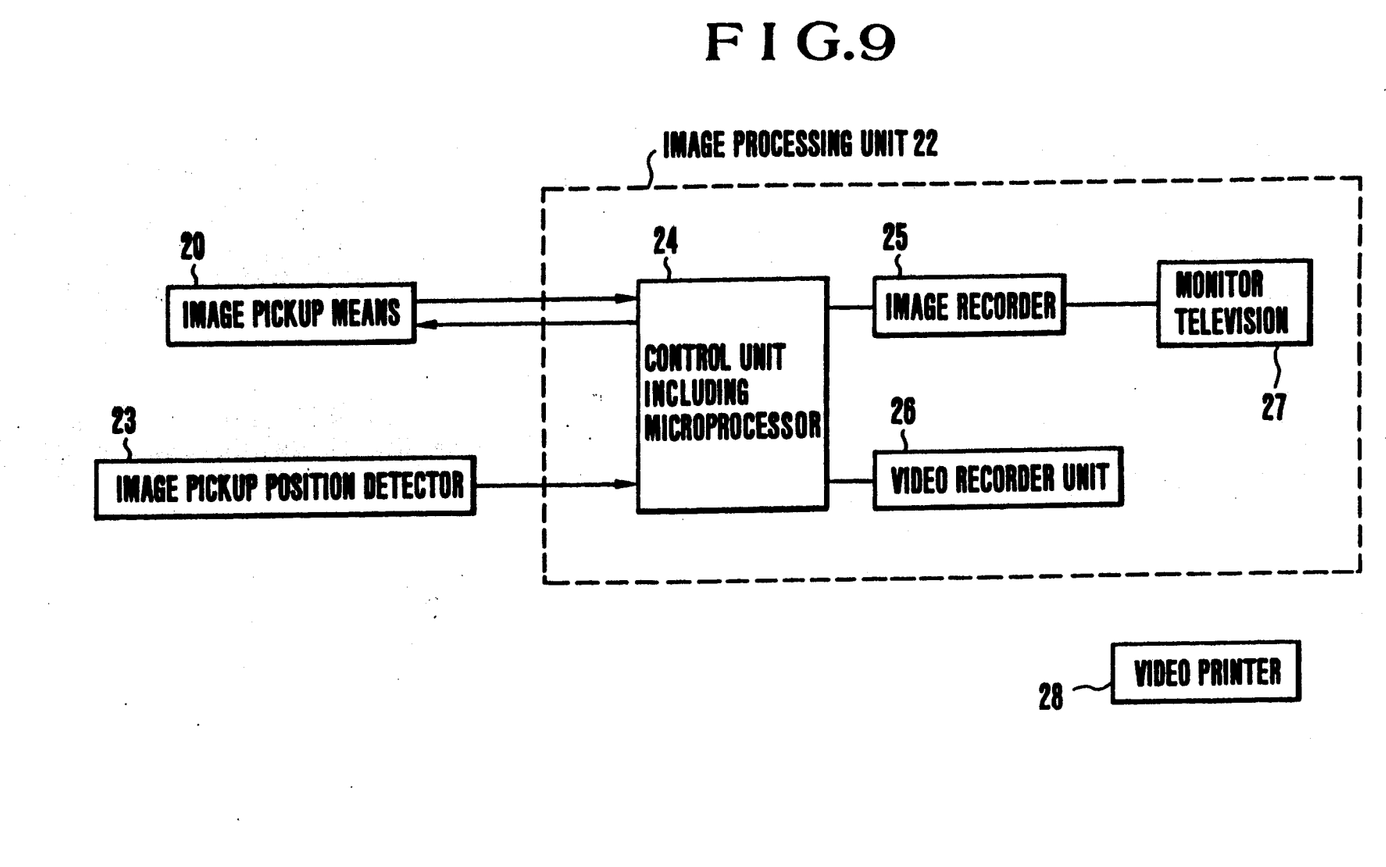
FIG. 9 is a view showing a block diagram of the image processing unit, FIG. 10 (a) and (b) show respectively a plan and a front view of the supporting frame.

As is shown in FIG. 9, the image processing unit 22 is composed of a control unit 24 which controls the total unit, an image recorder 25 made of a digital recorder which records image information from the image pickup means 20, a video recorder 26 to back up data and a monitor television 27 which monitors such as photographed images.

Moreover, record information such as image data recorded at the image recorder 25 are inputted into a video printer 28 directly or through a recording medium such as a floppy disk, and printed out as colored pictures. Furthermore, it can be arranged so that every image on the monitor television 27 is photographed by a still camera.

The images printed out here becomes the images of the developed surface of the inner circumferential wall of the investigation hole 17.

In the present embodiment, the image pickup means 20 is arranged so as to be lowered without rotating around the longitudinal center line of the investigation hole 17 to avoid a gap between the programmed and the described with reference to FIG. 8.

The image pickup means 20 has a conical mirror 30, above which is placed an image pickup device 31 made of CCD whose center of an optical axis of photographing is arranged in coincidence with a center line of the mirror, and by using the image pickup device 31 and by way of the mirror 30, the image pickup means 20 takes a photograph of the surface of the inner circumferential wall of the investigation hole 17 which is illuminated by a battery-powered light source 32 for illumination.

As the result of the above-mentioned processes the overall surface of the inner circumferential wall of the investigation hole 17 can be continuously photographed by means of the image pickup device 31.

The image pickup means 20 is fixed to the end of a supporting rod 33 whose diameter is a little smaller than that of the investigation hole 17, and a center axis of the supporting rod 33 and the center line of the optical axis of photographing of the image pickup device 31 are coincident with each other. In addition, when an investigation hole is approximately 1 cm in diameter, a fiberscope such as used as a camera for an examination of the stomach can be used.

In the mean time, the supporting rod 33 has to be inserted into the investigation hole 17 keeping both center axes in coincidence.

This is because any gap between two axes causes a damage of the image pickup means 20 which is given by the surface of the inner circumferential wall of the investigation hole 17 and because this damage must be avoided.

Figure 10A:
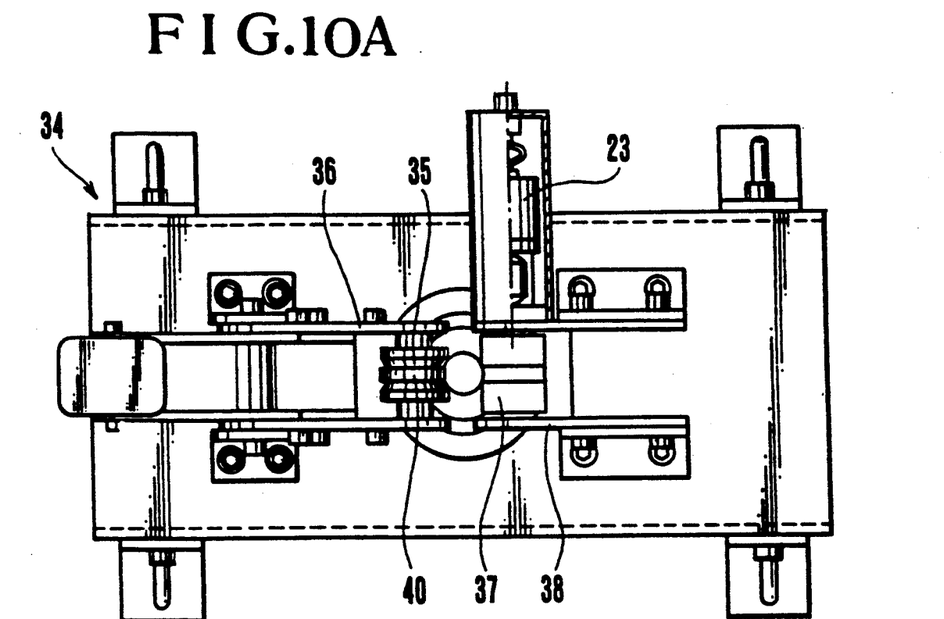
Figure 10B:
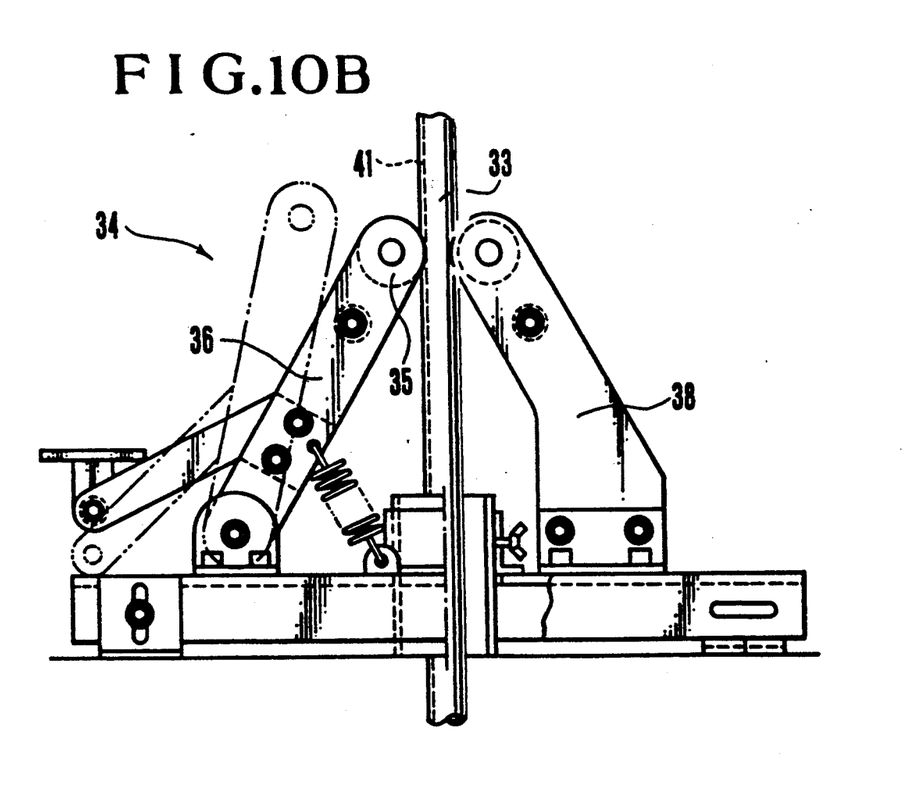

Therefore, the boring stand 10 is utilized in the present embodiment. Namely, the center axis of the investigation hole 17 is coincident with the center line of the rotary axis of the core drill 14 mounted on the boring stand 10, so that the base plate 11 is left in the same position, (in the state attached to the rear gate of the vehicle), after the boring operation of the investigation hole 17 is finished, and on which a supporting frame 34 shown in FIG. 10 is fixed to vertically support and guide the supporting rod 33 at the designated position on the base plate 11.

The supporting frame 34 has a guide roller 35 attached to the top thereof, a movable arm 36 which is strengthened by a spring, in the opposed position thereto a measurement arm 38 with a counter roller 37 attached to the top of the arm, and the supporting rod 33 is adapted so as to be inserted between these rollers 35 and 37.

The counter roller 37 is arranged so as to rotate in a friction contact with the inserted supporting rod 33 without slipping, and its rotation is detected by the position detector 23 such as a rotary encoder, and the data is inputted into the image processing unit 22 as the position (vertical position) information of the image pickup means 20.

Meanwhile, a projection 40 is formed on the circumferential surface of the guide roller 35 extending in the circumferential direction, which engages with a fitting groove 41 provided on the outer surface of the supporting rod 33 in the longitudinal direction.

That is, the supporting rod 33 is restricted to rotate around the axis when it is inserted into the hole with its fitting groove 41 which is engaged with the projection 40, and then this makes the image pickup means 20 to be inserted into the hole, for photographing the surface of the inner circumferential wall of the investigation hole 17, move vertically without rotating around the axis.

The supporting rod 33 is attached to a lifting attachment (not shown) to be mounted on the lifting device 13 in place of the core drill 14, and it functions in such a way that when it is inserted into the investigation hole 17 by an operator who manipulates the lifting handle 16, the distance of insertion simultaneously measured by a position detector 39 is recorded in a distance counter display of the image processing unit 22.

When a signal is put out for starting the photographing, the image pickup means 20 starts to photograph, and the images taken are recorded in the image recorder 25 and the data-back-up video recorder 26, and at the same time those records are displayed on the monitor television 27 at the real time so that the operator can confirm that the data is correctly gathered.

Namely, by inserting the supporting rod into the investigation hole, the surface of the inner circumferential wall of the investigation hole 17 can be photographed continuously all over the length thereof.

When the photographing of the investigation hole 17 is finished over the length, the supporting rod 33 is extracted from the investigation hole 17 and the hole is filled up.

In this filling up operation, a rapid-strength mortar cement is first poured into the hole from the bottom up to the part close to the surface layer portion and then the surface layer portion is filled up by an asphalt compound. The investigation hole 17 is small in diameter and is at most about 2 m deep, so that a small amount of a mortar cement suffices to fill up the hole, thus enabling a very efficient repairing operation, and no pavement is damaged during the operation.

That is, it may be said that the investigation by the investigation hole 17 which is small in diameter is a nondestructive investigation.

In this system, the image data obtained is printed out by the video printer 28, for example, as colored pictures at every photographing, and the data is used to show the depth of the photographing positions by these pictures together with by the images photographed concurrently.

By arranging the printed out picture sheets according to their positions upper and under, the developed pictures of the surface of the inner circumferential wall of the investigation hole 17 can be obtained over the length of the hole.

A series of operations mentioned above such as the boring of the investigation hole, the cleaning of the investigation hole, the photographing of the surface of the inner circumferential wall by means of the image pickup means and the filling up of the investigation hole after finishing the investigation, are conducted, for instance, at every 20 m in the length of the pavement which is selected as an object of an investigation, and by which the sectional structure of the pavement of such as several hundreds meter long can be known in the range of 1 through 2 m deep.

The equipment and instruments which are required for the present investigation of the ground structure are arranged to be mounted on the vehicle to be described later, together with the aforementioned equipments and instruments for the examination of the ground.

Next, the description of the vehicle which is mounted with the above-mentioned various kinds of apparatus will be made with reference to FIG. 1 through FIG. 3.

In the drawings, the reference numeral 80 denotes a vehicle what is called one box car, which is mounted with a first video camera 81 provided on the side of the vehicle, and a second video camera 82 provided on the front of the vehicle. Circumferential views of the road looked from the side of the vehicle are photographed by the first video camera 81 thus arranged, front views of the vehicle are photographed by the second video camera 82 thus arranged, and the video system of the position detection means B shown in FIG. 4 is composed of these cameras 81 and 82.

The reference numeral 83 represents an antenna which contains an antenna of the underground radar and an oscillator both arranged in an unit, and vertically movably supported in the rear of the vehicle, for instance, being vertically movable by means of a hydraulic lift 84 and at the time of examination, it is lowered to the designated position through an opening 85 which is formed in the floor of the vehicle. On both sides of the antenna 83, each water tank 86 is mounted and accommodates water to be used for such as the above-mentioned boring operation.

Further, the equipment for the underground radar means such as an electric generator 2, a chart recorder 7a, and a main control unit 1 are disposed on the right side of the vehicle, and an image processing unit 22 to be used for photographing the section of the bored hole shown in FIG. 9 is disposed on the left side of the vehicle.

Meanwhile, the present vehicle 80 is a rear power gate type in which a rear door opens and closes vertically, and a linear slider 88 which is slidable widthwise to the vehicle is attached to a rear gate 87 which opens downwardly, and a boring stand 10 is adapted so as to be attached to this linear slider 88.

Therefore, when the vehicle 80 is parked on the road, the rear gate 87 is opened and the boring stand 10 is attached to the linear slider 88 as shown in FIG. 3, then by moving the linear slider 88 in the direction of the width of the vehicle, the boring stand 10 can be placed at the position which is right for the boring of the investigation hole 17. The present boring stand 10 is mounted on the vehicle 80, and other equipment to be used for such as the boring operation as well as the photographing of the surface of the inner circumferential wall of the bored hole are also mounted on the vehicle 80.

Additionally, a road work sign 90 and a yellow revolving light 91 are mounted on the roof of the vehicle 80.

As is described above, according to the present invention, it is possible to observe the ground condition of the road while traveling at high velocity, so that the method of the present invention does not disturb the flow of running vehicles which has been disturbed in the conventional method, examination of the road by means of the underground radar can be conducted day and night, and further, it becomes possible to grasp precisely the singular point on the data which is obtained from the results of the observation.

Moreover, the vicinity of the singular point can be visually specified by synchronizing the covered distance and such as the scenery photographed by the video cameras from the vehicle window, so that the searching of the singular point becomes to be conducted much easier.

In the meantime, the stand for the boring of the singular point is adapted so as to be attachable to the rear gate of the vehicle, so that the boring operation after the examination of the ground is conducted easily without requiring any help of other vehicle, therefore it is also possible to perform the rapid and precise work by a small number of workers.

While the foregoing description and drawings represent the preferred embodiments of the present invention, it will be obvious to those skilled in the art that various changes and modifications may be made therein without departing from the true spirit and scope of the present invention.

What is claimed is:

1. A pavement structure examination vehicle comprising:
   a vehicle body of a rear gate type having a rear door which rotates vertically to open and close;
   underground radar means attached to said body vertically movable relative to the direction of traveling for providing observation data;
   a stand for a boring operation removably attached to said door;
   position detection means for detecting the distance covered by said vehicle and for recording visual images of an area surrounding said vehicle;
   a radar system comprising underground radar control means for controlling said underground radar means and observation data recording means for recording said observation data of said underground radar means, said radar system recording in said data recording means information of the distance covered by said vehicle provided by said position detection means, together with said observation data of said underground radar means; and
   an image processing system for photographing a surface of an inner circumferential wall of a bored hole and for processing images thus photographed.

2. A pavement structure examination vehicle according to claim 1, wherein said position detection means includes:
   a set of video cameras provided in said vehicle body of said vehicle for photographing areas in two different directions while traveling; and,
   image recording means for recording information of images photographed by said video cameras together with information of the distance covered by said vehicle.

3. A pavement structure examination vehicle according to claim 1, further comprising:
   means provided in said vehicle body to be used for the boring operation and for the photographing of a surface of an inner circumferential wall of bored hole.

4. A pavement structure examination vehicle according to claim 2, further comprising:
   means provided in said vehicle body to be used for the boring operation and the photographing of a surface of an inner circumferential wall of a bored hole.

* * * * *